Oct. 10, 1972 E. A. OSTER ET AL Re. 27,508

MACHINE FOR DISASSEMBLING COMPONENTS FROM COMPOSITE PRODUCTS

Original Filed Dec. 30, 1968 3 Sheets-Sheet 1

INVENTORS
EARL A. OSTER
THOMAS H. OSTER
BY John R. Faulkner
Thomas H. Oster
ATTORNEY

MACHINE FOR DISASSEMBLING COMPONENTS FROM COMPOSITE PRODUCTS

Original Filed Dec. 30, 1968 3 Sheets-Sheet 2

INVENTORS
EARL A. OSTER
THOMAS H. OSTER
BY John R. Faulkner
Thomas H. Oster
ATTORNEY

MACHINE FOR DISASSEMBLING COMPONENTS FROM COMPOSITE PRODUCTS

Original Filed Dec. 30, 1968 3 Sheets-Sheet 3

INVENTORS
EARL A. OSTER
THOMAS H. OSTER
BY John R. Faulkner
Thomas H. Oster
ATTORNEY United States Patent Office Re. 27,508
Reissued Oct. 10, 1972

27,508

MACHINE FOR DISASSEMBLING COMPONENTS FROM COMPOSITE PRODUCTS

Earl A. Oster and Thomas H. Oster, Dearborn, Mich., assignors to Ford Motor Company, Dearborn, Mich.

Original No. 3,561,072, dated Feb. 9, 1971, Ser. No. 787,646, Dec. 30, 1968. Application for reissue Feb. 17, 1971, Ser. No. 116,058
Int. Cl. B02c *13/00*
U.S. Cl. 241—186 R 5 Claims

Matter enclosed in heavy brackets [ ] appears in the original patent but forms no part of this reissue specification; matter printed in italics indicates the additions made by reissue.

ABSTRACT OF THE DISCLOSURE

This invention is concerned wtih a fragmentizing machine for the disintegration of solids and more particularly metallic objects. This fragmentization or disintegration permits the ready disassembling of components from composite products. The disintegration of these metallic objects is accomplished by accelerations imparted to the metallic objects by repeated collisions with rapidly moving blunt impact means driven by and secured to a rotating plate. This invention is especially concerned with apparatus for effecting the removal of the disintegrated or fragmentized material from the impact area.

THE INVENTION

The overall purpose of the apparatus of this invention is the disintegration or fragmentization of objects and particularly metallic objects. This fragmentization is carried out by repeated collisions of the metallic objects with blunt impact means driven by and secured to a horizontal steel plate which is in turn driven by a vertical shaft.

The objects undergoing fragmentization are confined within a vertical steel shell which is preferably cylindrical in form and which terminates at its lower end adjacent the rotating horizontal steel plate. The diameter of the vertical steel shell and the rotating steel plate are approximately the same.

It is essential that means be provided for the removal from the machine of the fragments or component parts once they have been reduced to the desired size by the collisions with the blunt impact means. The problem of the removal of the fragments is complicated by the fact that the individual fragments have a mass varying from a fraction of an ounce to almost one hundred pounds and are ejected from the fragmentization area at velocities ranging up to two hundred feet per second. The removal mechanism must be capable of handling materials such as soft copper wire which tangles badly and with very greasy metals which tend to clog any such mechanism.

THE MACHINE

The fragmentizing or disintegrating machine and the specific means for the removal of disintegrated or fragmentized materials from the impact area can readily be understood by reference to the six figures of drawings in which.

Figure 1:
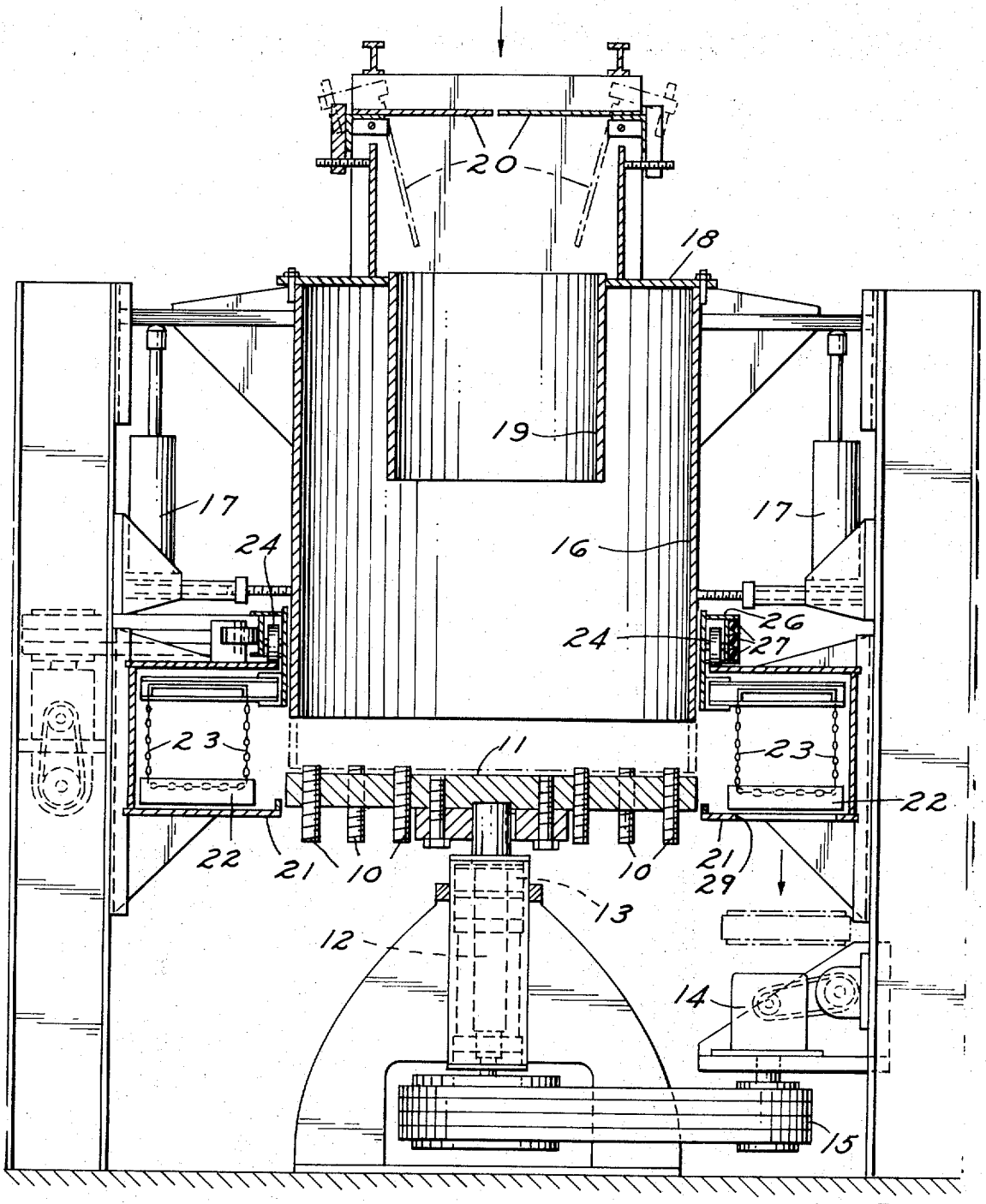
FIG. 1 is a vertical central section of the machine giving an overall view of the structure of the machine.

The actual disintegration or fragmentization of the metallic objects is accomplished by repeated collisions with blunt impact means which are shown as bolts 10. In practice these blunt impact means are bolts three inches in diameter made of a medium carbon steel (SAE 4140) hardened to about Rockwell C 38 to 42. These bolts 10 are threaded through plate 11 which is composed of mild steel, has a thickness of eight inches and a diameter of eight feet. Locking means (not shown) prevent undesired rotation of bolts 10. Plate 11 and bolts 10 are mounted upon shaft 12 which is supported in bearings 13. Plate 11 is driven by motor 14 through belts 15. Motor 14 is a 200 H.P. variable speed D.C. machine. The plate 11 carries about 30 bolts 10. The usual operating speed of plate 11 is between 200 and 600 revolutions per minute.

The material being disintegrated or fragmentized is contained within shell 16, the lower end of which is located adjacent the periphery of plate 11. Shell 16 is fabricated from mild steel 2.5 inches thick, is about eight feet long and has an outer diameter approximately the same as plate 11. Shell 16 is supported and adjusted in a vertical direction by hydraulic cylinders 17. Shell 16 is very solidly supported from movement in any direction other than the vertical by means shown but not described. This supporting structure is deemed self-evident. In actual operation the spacing between the upper surface of plate 11 and the lower end of shell 16 has varied from about eight inches when fragmentizing whole automobile engines down to a fraction of an inch when fragmentizing small electric motor armatures.

The fragmentizing or disintegrating action of this machine depends upon the fact that collisions between the objects to be fragmentized and the blunt bolts 10 produce accelerations of a magnitude which are destructive to practically all metals. This basic fact can be appreciated from the following typical set of operating conditions. The bolts 10 are normally set so that they project about 1.5 inches above plate 11. The upper parts of these bolts wear so that they make an acute angle with the plate. A typical operating speed of 480 revolutions per minute or 8 revolutions per second imparts to bolts 10 a peripheral speed of about 200 feet per second. An object to be fragmentized and rested upon the peripheral portion of plate 11 upon impacting a bolt 10 to avoid rupture would be compelled to accept an acceleration in the vertical direction of a magnitude that would cause it to rise the 1.5 inches the bolts 10 are adjusted above the plate in the length of time required for the plate periphery to move a bolt diameter or three inches. This calculates to 0.00125 second. To move 1.5 inches in 0.00125 second from an original zero velocity requires an acceleration of 160,000 feet per second per second or 5,000 g's. These values are catastrophic to essentially metallic objects.

It is fundamental to the operation of the machine that the metal objects being disintegrated or fragmentized are disintegrated only by these enormous acceleration effects or otherwise stated by their own inherent and unavoidable inertia. They are free to move at all times away from the blunt impact means or bolts 10 and in an upward direction.

The problem of collecting and removing from the machine the disintegrated and fragmented metal objects has been complicated by the fact that each piece may weigh almost 100 pounds and is ejected by blunt impact means (bolts 10) through the opening between the bottom of the shell 16 and the upper face of plate 11 at velocities up to two hundred feet per second. The problem is, of course, further complicated by the tendency of soft copper wire to entangle and form balls and the tendency of grease accumulating from greasy articles to harden and act as an adhesive holding the fragments in place.

SPECIFICALLY

Figure 2:
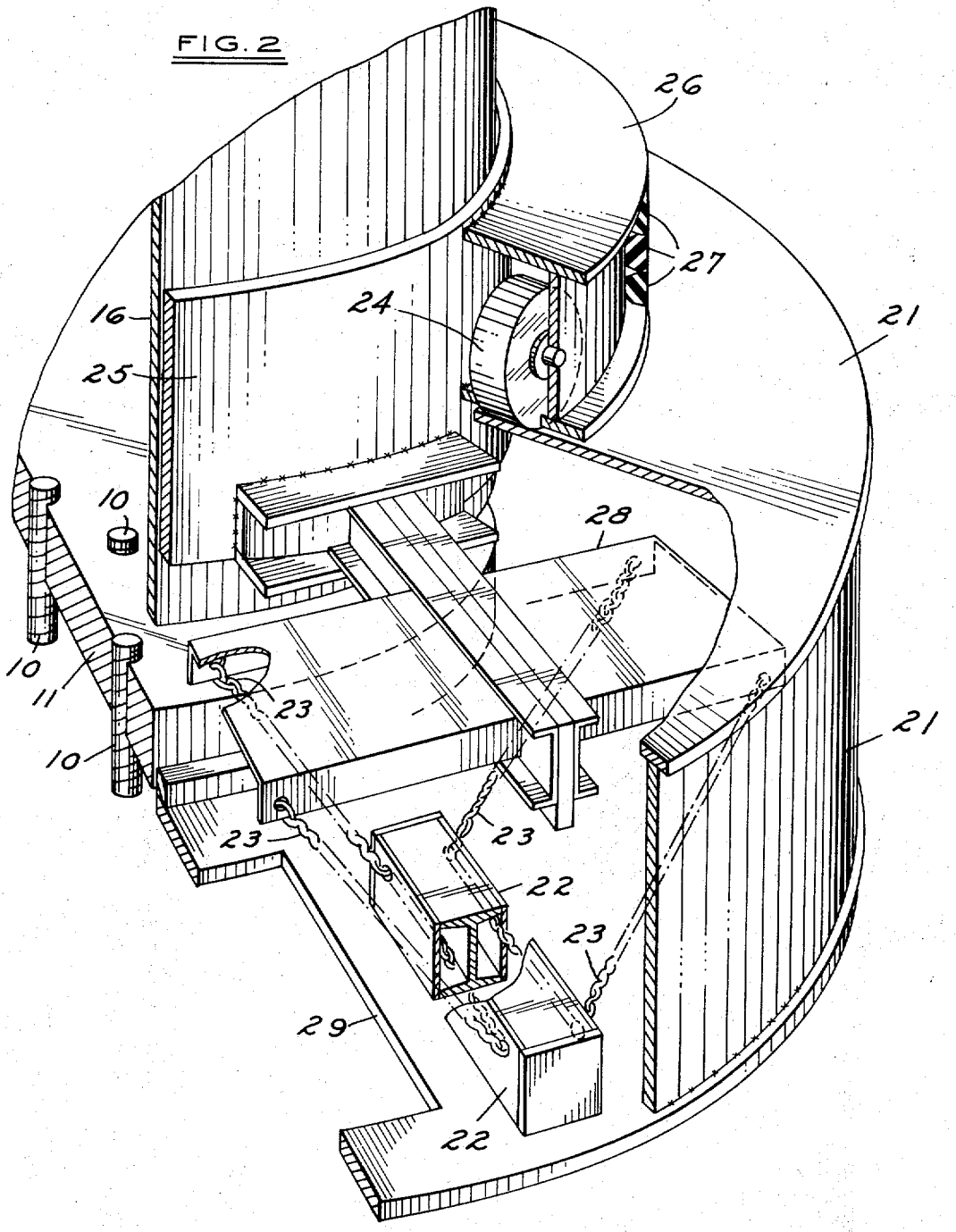
FIG. 2 is a perspective view partly in section showing one modification of the fragment removal apparatus.

The basic element of the mechanism for intercepting and removing the fragmentized metal objects is an annular chamber 21 constructed of heavy steel plate and located adjacent the space between the upper surface of plate 11 and the lower end of shell 16. This annular chamber 21 and its relationship to the remainder of the machine is best seen in FIGS. 1 and 2. This annular chamber 21 serves to intercept the fragments which are ejected from the impact area. It is necessary that annular chamber 21 be provided with means for ejecting such fragments from the machine.

A commercially successful apparatus for ejecting the fragmented metal objects from the machine is shown in FIGS. 1 and 2, but is most easily understood from FIG. 2. A sweep cylinder 25 surrounds the lower end of shell 16 with a rotating clearance between sweep cylinder 25 and shell 16. A collar 26 is firmly welded to sweep cylinder 25 and journals rollers 24 which support sweep cylinder 25 for rotation around shell 16. Rollers 24 rotate upon and are supported by the upper surface of annular chamber 21. Provision is made in collar 26 for the reception of V belts 27 by means of which collar 26 is rotated about shell 16. Beam member 28 is supported upon sweep cylinder 25 so that beam member 28 rotates within annular chamber 21 as sweep cylinder 25 rotates. Bar 22 is supported by chains or cables from beam member 28. This bar 22 may be fabricated as illustrated, or it may be a solid bar of steel. The lower surface of bar 22 either rests upon or slightly clears the upper surface of the bottom of annular chamber 21. The fragmented metal objects are intercepted by the peripheral wall of annular chamber 21, fall to the floor or bottom of annular chamber 21 and are then pushed along the bottom or floor of annular chamber 21 until they fall by gravity through opening 29 onto conveying means which is not shown. The flexibility and yielding qualities of chain or cable enable these members to resist the tremendous impacts which occur when the fragmented objects being ejected strike these chains, cables or bar 22.

Figure 3:
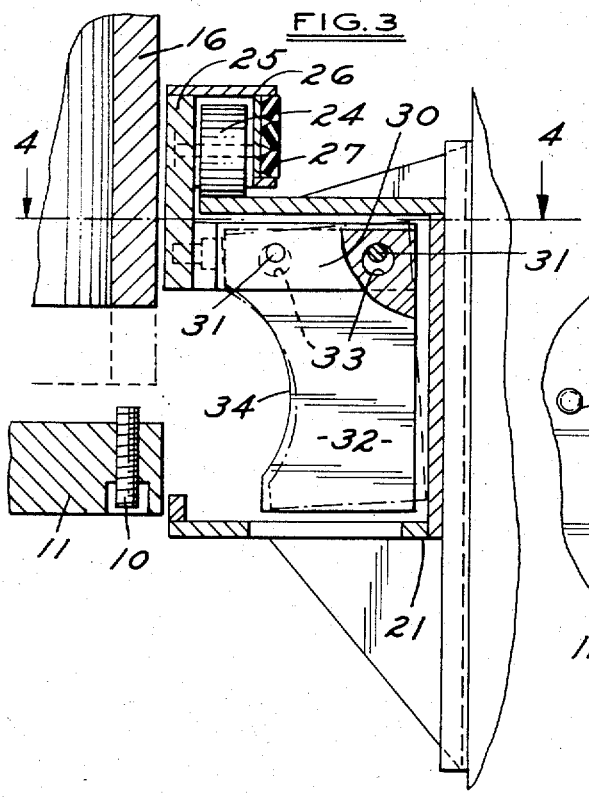
FIG. 3 is a vertical section showing a particular form of the fragment removal apparatus.
Figure 4:
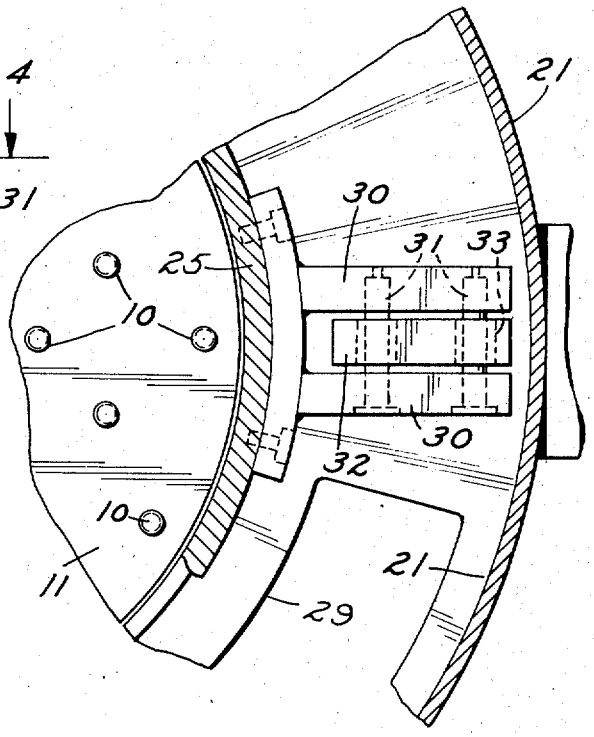
FIG. 4 is a horizontal sectional view of the apparatus shown in FIG. 3.

FIGS. 3 and 4 depict a further form of sweeping apparatus for moving the fragmentized metal objects to opening 29. In this structure two rugged supporting members 30 are firmly secured to and project radially from sweep cylinder 25. Supporting members 30 support a pair of pins 31. The axes of these pins 31 are perpendicular to supporting members 30. These pins 31 support sweep blade 32 in pin receptacles 33 which are in the form of holes machined into the upper portion of sweep blade 32. The diameter of pin receptacles 33 is purposely made much larger than the diameter of pins 31. This serves the purpose of permitting a portion of the shock imparted to sweep blades 32 by fragmentized metal objects to be taken up by the sturdy annular chamber 21. The dotted lines in FIG. 3 depict the position assumed by sweep blade 32 when it is driven radially by the impact of a fragmented metal object. Note that sweep blade 32 then receives radial support from the side wall of annular chamber 21. The inner surface of sweep blade 32 is given an arcuate form so that the majority of the impacts received from fragmentized metal objects will occur at an angle less than ninety degrees rather than at ninety degrees at which the severity of the impact would be a maximum. The thickness of sweep arm 32 would normally be four to six inches.

Figure 5:
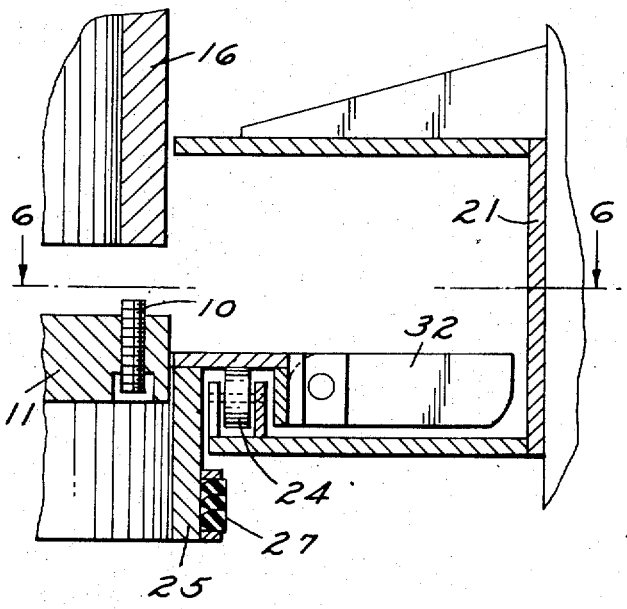
FIG. 5 is a vertical section of a further form of the apparatus for the removal of fragments from the machine.
Figure 6:
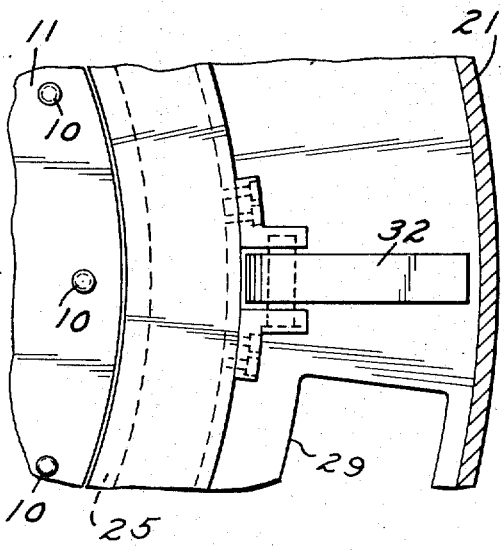
FIG. 6 is a horizontal section of the device shown in FIG. 5.

FIGS. 5 and 6 depict a structure which differs from that shown in FIGS. 1 to 4 in that the parts have been rearranged so that the upper surface of sweep blade 32 is below the upper surface of plate 11. This structure has the advantage that the fragmented metal objects leaving the opening between the bottom of shell 16 and the top of plate 11 cannot strike the sweep arm radially, but will pass over the top of sweep arm 32 and expend their kinetic and destructive energy against the interior of annular chamber 21 which can be made as heavy as necessary to absorb this energy.

We claim as our invention:

1. A fragmentizing machine for the disassembly of components from composite [products] *solids* by means of accelerations imparted to said solids by collisions with rapidly moving blunt impact means driven by and secured to a rotating plate, said machine including a vertical shell terminating at its lower end near the upper surface of said rotating plate and further including an annular chamber surrounding the space between the lower end of the vertical shell and the upper [face] *surface* of the rotating plate, said annular [space containing rotating sweeping means and] *chamber having* an opening in the bottom of [of the annular chamber] *thereof* for the escape of the solids which have been disassembled or disintegrated by repeated collisions with the rapidly moving blunt impact means, said *annular chamber containing* rotating sweeping means including a rotatable sweep cylinder surrounding the vertical shell and supporting at least one sweep bar in the annular chamber by means of chain.

2. [The structure recited in claim 1 in which] *A fragmentizing machine for the disassembly of components from composite solids by means of accelerations imparted to said solids by collisions with rapidly moving blunt impact means driven by and secured to a rotating plate, said machine including a vertical shell terminating at its lower end near the upper surface of said rotating plate and further including an annular chamber surrounding the space between the lower end of the vertical shell and the upper surface of the rotating plate, said annular chamber having an opening in the bottom thereof for the escape of the solids which have been disasembled or disintegrated by repeated collisions with the rapidly moving blunt impact means, said annular chamber containing rotating sweeping means including a* rotatable sweep cylinder *surrounding the vertical shell and* loosely *supporting* [supports] at least one sweep blade in the annular chamber.

3. The structure recited in claim *2* [1] in which the sweep blade is mounted to permit it to move into contact with and receive support from the surrounding annular chamber when struck by disintegrated objects.

4. The structure recited in claim *2* [1] in which the inner edge of the sweep blade is arcuate in shape to lessen the severity of the blows by disintegrated objects.

5. [The structure recited in claim 1 in which the] *A fragmentizing machine for the disassembly of components from composite solids by means of accelerations imparted to said solids by collisions with rapidly moving blunt impact means driven by and secured to a rotating plate, said machine including a vertical shell terminating*

*at its lower end near the upper surface of said rotating plate and further including an annular chamber surrounding the space between the lower end of the vertical shell and the upper surface of the rotating plate, said annular chamber having an opening in the bottom thereof for the escape of the solids which have been disassembled or disintegrated by repeated collisions with the rapidly moving blunt impact means, said annular chamber containing rotating sweeping means including a* rotatable sweep cylinder [is] mounted concentrically with the vertical shell and *supporting* [supports] at least one sweep blade in the annular chamber, the upper surface of the sweep blade being no higher than the upper surface of the rotating plate.

References Cited

The following references, cited by the Examiner, are of record in the patented file of this patent or the original patent.

UNITED STATES PATENTS

| | | | |
|---|---|---|---|
| 1,788,683 | 1/1931 | Bramley Moore | 241—188 R |
| 1,987,941 | 1/1935 | Mathews | 241—257 |
| 3,429,022 | 2/1969 | Oster | 241—188 R |

ROBERT L. SPRUILL, Primary Examiner

U.S. Cl. X.R.

241—188 A